Jan. 23, 1962   J. GILDAY   3,017,764
TEST ADAPTER FOR AIRCRAFT STATIC VENT AND SYSTEM
Filed May 9, 1960
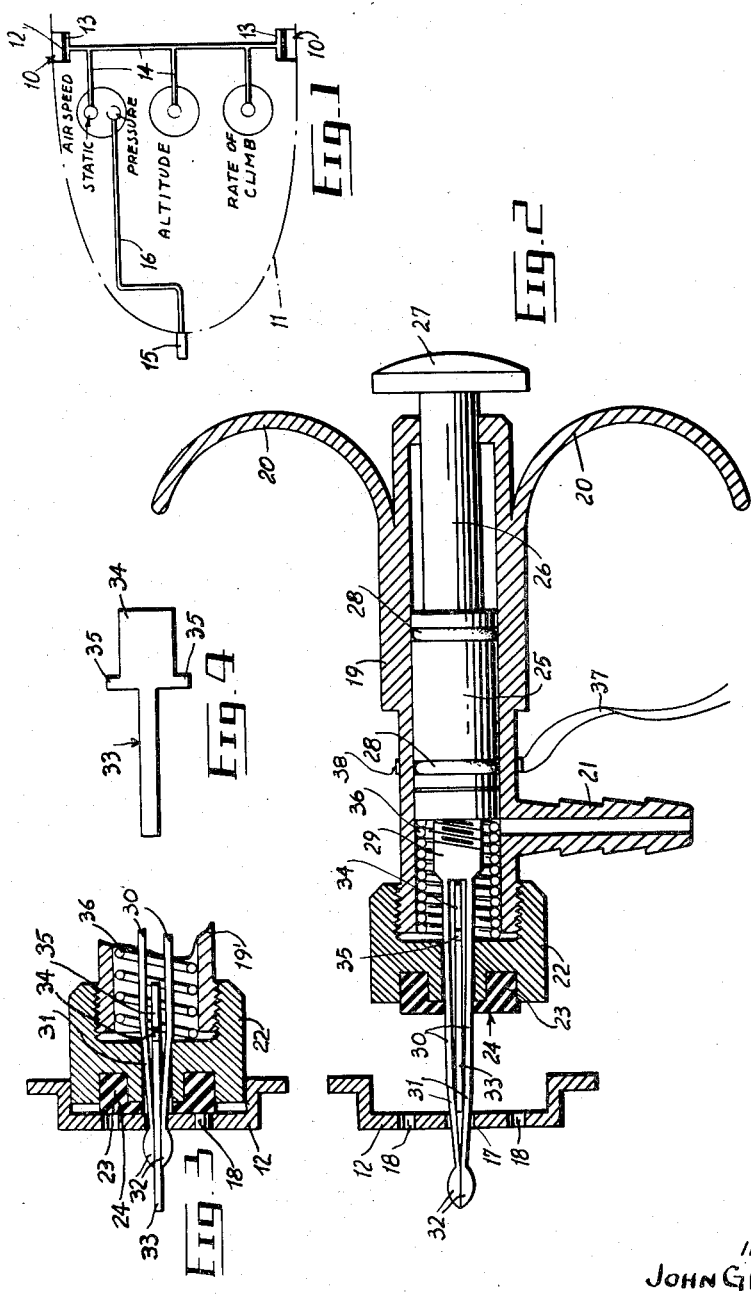
INVENTOR
JOHN GILDAY
By Hetherstonhaugh & Co
ATTORNEYS

United States Patent Office 3,017,764
Patented Jan. 23, 1962

3,017,764
TEST ADAPTER FOR AIRCRAFT STATIC
VENT AND SYSTEM
John Gilday, 1665 Guertin St., St. Laurent,
Quebec, Canada
Filed May 9, 1960, Ser. No. 27,879
8 Claims. (Cl. 73—4)

The present invention relates to an adapter for connecting pepper pot type aircraft static vents of a static system to a source of vacuum for testing purposes.

Static vents of this type comprise recessed plates mounted on the sides of the fuselage and having a central hole and a plurality of slightly smaller holes around it. The plate is part of a chamber through which the holes are connected collectively to the tubes leading to the static side of the air speed indication instrument and to the indicators of the altitude and rate of climb instruments.

It is essential for the safety of the aircraft that the various static instruments of the system be in perfect order, and therefore they must be tested periodically on the ground by applying a suitable vacuum type tester which is attached to the vents.

It is the object of this invention to provide an improved adapter for connecting the vents to a testing machine, such an adapter being inexpensive and convenient to operate, and capable of effecting a perfectly tight seal with the vent.

Of the two vents on opposite sides of the fuselage, one is fitted with a test adapter for connection to the testing machine, and the other is fitted with a blanking adapter in order to seal the vent. The test and blanking adapters which embody the invention are of similar construction, except for the fact that the blanking adapter is not provided with means for connection to the testing machine, but is instead closed off.

The adapters consist essentially of a sealing gland adapted to cover the holes of the vent, and of a device having a pair of jaws which extend through the central hole of the vent and may be distended by a pin mounted between them, so as to engage the hole and lock thereon. A spring urges the device forwardly with respect to the sealing gland, so as to press the gland against the vent and form a seal thereon.

An embodiment of the invention is illustrated by way of example in the accompanying drawings in which:

FIG. 1 is a diagram of the setting of the static vents in the fuselage of an aircraft, for purposes of identification;

FIG. 2 is an axial section of the test adapter partly fitted on a vent;

FIG. 3 is a fragmentary axial section of the blanking adapter in operative position on a vent; and FIG. 4 is a detail of the pin seen in a longitudinal plane at a right angle to the plane of FIGS. 2 and 3.

Referring to FIG. 1, the static vents 10 on each side of the fuselage 11 comprise each a recessed pepper pot type plate 12 with a chamber 13 behind it. Chambers 13 are connected by tubes 14 collectively to the "Static" indicator of the "Air Speed" instrument and to the indicators of the "Altitude" and "Rate of Climb" instruments. A Pitot tube 15 at the nose of the fuselage is connected by a tube 16 to the "Pressure" indicator of the "Air Speed" instrument.

Referring to FIG. 2, the pepper pot plate 12 is shown in greater detail, and is seen to have a central hole 17 and a plurality of slightly smaller holes 18 around it.

Referring to FIG. 2, the test adapter comprises a cylinder 19 provided with a pair of opposite finger grips 20. The cylinder 19 has a hose connection 21 integral therewith and extending radially. The end of the cylinder 19 opposite the finger grips 20 is threaded to receive a cap 22 having on its outer face an annular recess adapted to receive the positioning crown 23 of an outwardly flat sealing gland 24. The cap 22 is of such size as to fit into the recessed pepper pot plate 12, and the sealing gland is large enough to cover the holes 18 of the pepper pot plate 12.

The sealing gland 24 has a central hole which registers with a central hole of the cap 22 and which is adapted to register with the central hole 17 of the pepper pot plate 12.

A plunger 25 is slidably mounted in the cylinder 19 and has a restricted rod portion 26 extending through a hole at the finger grip end of the cylinder. A knob 27 is removably assembled on the outer end of the rod portion 26. The plunger is in sealed engagement with the cylinder by means of O-rings 28 disposed in grooves on the plunger.

A locking member 29 having a pair of elongated jaws 30 is screwed into the inner end of the plunger 25. The jaws 30 are spaced apart for the major part of their length and are bent inwardly towards each other near their outer ends, at 31. Each jaw 30 has an enlarged end portion 32. The jaws 30 extend through the holes in the cap 22 and in the sealing gland 24.

A flat pin 33 is mounted between the jaws 30 and also extends through the holes of the cap and of the sealing gland. As shown in FIG. 4 the pin 33 comprises an enlarged end portion 34 and a pair of ears 35. The flat portion 34 fits within a compression coil spring 36 mounted within the cylinder 19 and bearing against the plunge 25. The spring 36 engages the ears 35 of the pin 33 and permanently holds the pin against the cap 22.

The blanking adapter shown in FIG. 3 is identical in construction with the testing adapter shown in FIG. 2, with the exception that the blanking adapter cylinder 19' does not have a hose connection such as 21. The remaining elements are identical to the corresponding elements of the testing adapter and are interchangeable therewith; therefore they have been indicated in the drawing by the same reference numerals.

When the adapter is not in use the spring 36 urges the plunger 25 against the end wall of the cylinder 19 or 19'. In this position the jaws 30 are distended at their end portions 31 by the pin 33. In operation the adapter is gripped by placing the index and middle finger on the finger grips 20, and the thumb on the knob 27. The plunger 25 is pushed towards the cap 22 against the action of spring 36, until the jaw portions 31 clear the pin 33. In this position the enlarged portions 32 can pass through the hole 17 of the pepper pot plate 12 (FIG. 2).

Pressure on the plunger is then released, thus causing the jaw portions 31 to be distended by the pin 33, so that the enlarged portions 32 engage the back of the pepper pot plate 12 and lock on the hole 17. As the plunger 25 is further released the cap 22 enters the recess of the pepper pot plate 12, and the sealing gland 24 covers the holes 18 of the pepper pot plate, and is pressed against the plate by the action of spring 36 thus effecting a seal (FIG. 3).

When making a test the test adapter (FIG. 2) is mounted on the static vent on one side of the fuselage, and the blanking adapter is mounted on the static vent on the other side. In some cases it is preferable to supply pressure or vacuum also to the Pitot tube 15, fitted for this purpose with a suitable adapter. A tape 37 to prevent unintentional tampering with the adapters is secured by means of a spring clip 38 embracing the cylinder 19 or 19'. The tape is preferably fluorescent so as to be visible at night.

The invention is limited not to the embodiments de-

What I claim is:

1. An adapter for pepper pot type vents of an aircraft static system comprising a flat sealing gland adapted to cover the holes of said vent and having an opening registering with one of said holes, a member having a pair of jaws extending through said hole of said gland, resilient means urging said member away from said gland, a pin mounted between said jaws in a fixed position with respect to said sealing gland, said jaws having enlarged end portions adapted to enter said one of said holes when said jaws clear said pin in a position of said member near said sealing gland, said jaws being distensible by said pin when said member is pushed away from said sealing gland by said resilient means, said enlarged end portions, when said jaws are distended, being engageable with said one of said holes, and a chamber sealed on said member and on said sealing gland.

2. A test adapter for pepper pot type vents of an aircraft static system comprising a flat sealing gland adapted to cover the holes of said vent and having an opening registering with one of said holes, a member having a pair of jaws extending through said hole of said gland, resilient means urging said member away from said gland, a pin mounted between said jaws in a fixed position with respect to said sealing gland, said jaws having enlarged end portions adapted to enter said one of said holes when said jaws clear said pin in a position of said member near said sealing gland, said jaws being distensible by said pin when said member is pushed away from said sealing gland by said resilient means, said enlarged end portions, when said jaws are distended, being engageable with said one of said holes, a chamber sealed on said member and on said sealing gland, and means to connect said chamber to a testing machine.

3. A test adapter for pepper pot type vents of an aircraft static system comprising a cylinder, a cap secured to one end of said cylinder, said cap having a central hole, a sealing gland mounted externally on said cap and having a central hole registering with said hole of said cap, said sealing gland being adapted to cover the holes of said vent and to have its central hole registering with the central hole of said vent, a plunger slidably mounted in said cylinder and extending outside said cylinder at the other end of the latter, sealing means between said plunger and said cylinder, a hose connection secured to and communicating with said cylinder, a member secured axially to said plunger and having a pair of jaws extending through said holes of said gland and of said cap, a compression spring mounted in said cylinder between said cap and said plunger, a pin extending through said holes of said gland and of said cap between said jaws, said pin having ears engaged between said spring and said cap to hold said pin in a fixed position with respect to said cap, said jaws having enlarged end portions adapted to enter said central hole of said vent when said end portions clear said pin in a position of said plunger near said cap, said jaws being distensible by said pin when said plunger is pushed away from said cap by said spring, said enlarged end portions, when said jaws are distended, being engageable with said central hole of said vent.

4. A test adapter according to claim 3, further comprising finger grips secured to said cylinder and a knob secured to the outer end of said plunger.

5. A test adapter according to claim 3, further comprising a warning tape secured to said adapter.

6. A test adapter according to claim 3, further comprising a fluorescent warning tape secured to said adapter.

7. A test adapter according to claim 3, wherein said cap has on its outer face an annular recess, and said sealing gland has a crown fitting in said recess.

8. A blanking adapter for pepper pot type vents of an aircraft static system comprising a cylinder, a cap secured to one end of said cylinder, said cap having a central hole, a sealing gland mounted externally on said cap and having a central hole registering with said hole of said cap, said sealing gland being adapted to cover the holes of said vent and to have its central hole registering with the central hole of said vent, a plunger slidably mounted in said cylinder and extending outside said cylinder at the other end of the latter, sealing means between said plunger and said cylinder, a member secured axially to said plunger and having a pair of jaws extending through said holes of said gland and of said cap, a compression spring mounted in said cylinder between said cap and said plunger, a pin extending through said holes of said gland and of said cap between said jaws, said pin having ears engaged between said spring and said cap to hold said pin in a fixed position with respect to said cap, said jaws having enlarged end portions adapted to enter said central hole of said vent when said end portions clear said pin in a position of said plunger near said cap, said jaws being distensible by said pin when said plunger is pushed away from said cap by said spring, said enlarged end portions, when said jaws are distended, being engageable with said central hole of said vent.

No references cited.